United States Patent [19]

Nagano

[11] Patent Number: 5,186,072
[45] Date of Patent: Feb. 16, 1993

[54] BICYCLE SPEED CONTROL SYSTEM FOR CONTROLLING A CHANGE SPEED DEVICE THROUGH A CHANGE SPEED WIRE

[75] Inventor: Masahi Nagano, Izumi, Japan

[73] Assignee: Shimano, Inc., Osaka, Japan

[21] Appl. No.: 790,164

[22] Filed: Nov. 12, 1991

[30] Foreign Application Priority Data

Nov. 13, 1990 [JP] Japan ................... 2-308126

[51] Int. Cl.⁵ .................... F16C 1/10; G05G 9/06
[52] U.S. Cl. .................... 74/501.5; 74/489; 74/502.2
[58] Field of Search .............. 74/489, 501.5, 502.2

[56] References Cited

U.S. PATENT DOCUMENTS

| | | | |
|---|---|---|---|
| 3,104,559 | 9/1963 | Dotter | 74/489 |
| 3,742,580 | 7/1973 | Sullivan, Jr. | 74/489 X |
| 3,943,794 | 3/1976 | Shimada | 74/502.2 X |
| 3,972,247 | 8/1976 | Armstrong | 74/489 |
| 4,066,154 | 1/1978 | Ross | 74/489 X |
| 4,699,018 | 10/1987 | Tagawa | 74/475 |
| 4,731,046 | 3/1988 | Juy | 474/80 |
| 4,936,160 | 6/1990 | Barnard et al. | 74/489 X |
| 5,012,692 | 5/1991 | Nagano | 74/475 |
| 5,052,241 | 10/1991 | Nagano | 74/502.2 |
| 5,094,120 | 3/1992 | Tagawa | 74/489 X |

FOREIGN PATENT DOCUMENTS

| | | |
|---|---|---|
| 8536537 | 3/1986 | Denmark . |
| 0352733 | 1/1990 | European Pat. Off. . |
| 0392457 | 10/1990 | European Pat. Off. . |
| 2-88384 | 3/1990 | Japan . |
| 2012893 | 8/1979 | United Kingdom . |

Primary Examiner—Leslie A. Braun
Assistant Examiner—Nicholas Whitelaw
Attorney, Agent, or Firm—Dickstein, Shapiro & Morin

[57] ABSTRACT

A speed control system for a bicycle for controlling a change speed device through a change speed wire, having a shift lever movable in opposite directions from a home position, a take-up reel connected to one end of the wire for winding up the wire with movement in one direction of the shift lever, a one-way transmission mechanism for transmitting only movement in one direction of the shift lever to the take-up reel, position retaining teeth and a position retaining pawl for retaining the take-up reel in a plurality of winding positions, and a retention canceling cam mechanism for canceling retention of the take-up reel by the position retaining teeth and pawl, and for allowing the take-up reel to rotate in the wire unwinding direction. The take-up reel is successively shifted in the winding direction by reciprocating the shift lever on one side of the home position and, when the shift lever is shifted to the other side of the home position, the take-up reel is freed from its retained position by action of the release element.

12 Claims, 16 Drawing Sheets

FIG. 5a
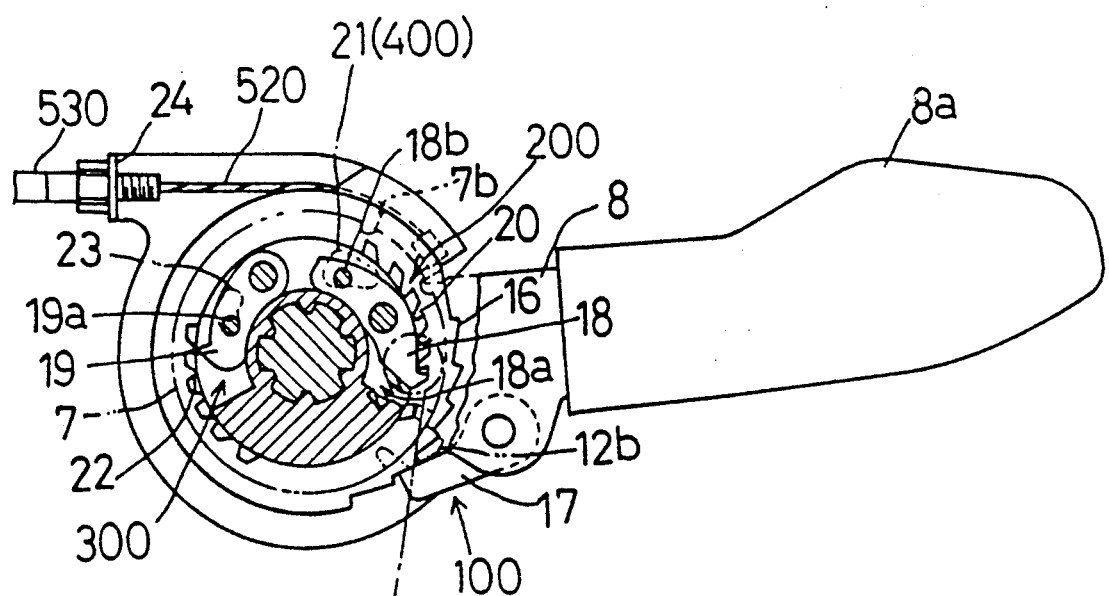
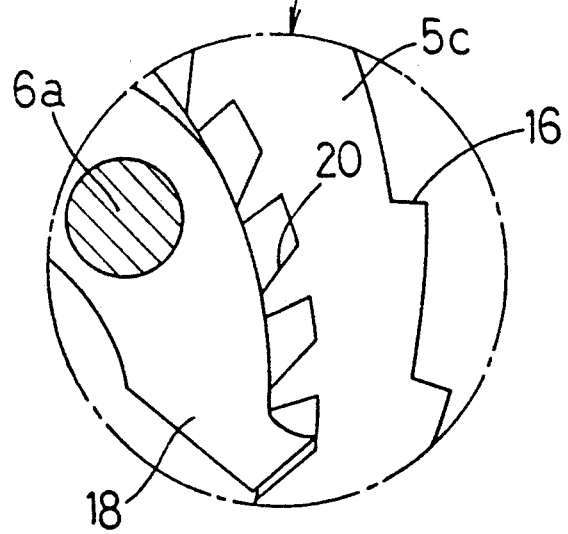
FIG. 5b

BICYCLE SPEED CONTROL SYSTEM FOR CONTROLLING A CHANGE SPEED DEVICE THROUGH A CHANGE SPEED WIRE

BACKGROUND OF THE INVENTION

1. Field of the Invention

The present invention relates to a speed control system for a bicycle for controlling a change speed device through a change speed wire, having:

a control member movable between a first shift end and a second shift end;

a device connected to one end of the change speed wire, and movable in a wire winding direction and in a wire unwinding direction, the take-up device being urged in the wire unwinding direction;

a one-way transmission device for transmitting only movement toward the second shift end of the control member to the takeup device, the takeup device being movable in the wire winding direction by the movement toward the second shift end;

a position retaining device for retaining the take-up device in a plurality of winding positions; and a retention canceling device for canceling retention of the take-up device by the position retaining device, and allowing the take-up device to move in the wire unwinding direction.

2. Description of the Related Art

Conventional bicycle speed control systems of the type noted above are known from Japanese Patent Publication Kokai No. 1990-88384 and U.S. Pat. No. 5,012,692, for example. These control systems include a release lever besides a shift lever, for releasing a change speed wire take-up reel from a position retaining device. Further, a spring is provided for urging the take-up reel in a wire unwinding direction in order to expedite rotation in the unwinding direction of the take-up reel after its release from the position retaining device.

In such a construction, the shift lever returns to home position after each shifting operation. This feature provides the advantage of allowing the shift lever to be operated within an optimal stroke range from the human engineering point of view, even when the shift lever is operated to provide a speed many stages away from the home position. That is, the shift lever is shifted back and forth plural times to effect change speed in the wire winding direction, i.e. in a positive direction. Conversely, when effecting change speed in the wire unwinding direction, i.e. in a negative direction, the release lever is operated to release the take-up reel from the position retaining device, whereby the take-up reel automatically rotates backward.

However, since the release lever is provided besides the shift lever, the cyclist could easily operate the wrong lever in a change speed operation. As a result, there is not a little chance of effecting change speed in the wrong direction. Furthermore, this type of speed control system may be disposed adjacent a grip of a handlebar. In such a case, the position of the shift lever optimal from the human engineering point of view is limited for manipulation with the thumb and finger. Consequently, where the two levers are provided, at least one must be located in a position difficult to operate.

In addition, according to the above construction, the force of the spring for urging the take-up reel in the wire unwinding direction presents a resistance to turning of the shift lever in the wire winding direction. This provides the drawback of giving a heavy feeling when the cyclist operates the shift lever in the wire winding direction.

SUMMARY OF THE INVENTION

An object of the present invention is to provide a bicycle speed control system which is capable of checking an operational error with respect to a change speed direction, and allows a control member to be used with ease from the human engineering point of view.

Another object of the invention is to realize a light and easy operation of a control member in a wire winding direction.

The above objects are fulfilled, according to the present invention, by a bicycle speed control system as set forth in the introductory part hereof, wherein the retention canceling device includes a release element movable between a release position and a non-release position, and an urging device for urging the release element to the non-release position, the release element being movable to the release position by movement of the control member from home position toward the first shift end.

According to this control system, the control member is operatively connected to the take-up device through a one-way mechanism to move the take-up device only in a wire winding direction. Consequently, the takeup device is successively shifted in the winding direction by reciprocating the control member between home position and second shift end. After operating the control member to the second shift end, i.e. in the wire winding direction, the control member is returned to the home position manually or by a spring, for example. Change speed may be effected for plural speed stages by repeating the above reciprocation. When the control member is shifted from the home position to the first shift end, the take-up device is freed from position retention by action of the release element included in the retention canceling device. As a result of the release, the takeup device urged in the wire unwinding direction rotates in the unwinding direction, thereby effecting a return through change speed stages. Since the release element is urged by the urging device in the wire winding direction, the release element is restricted against rotation in the wire unwinding direction without a releasing operation by the cyclist. Consequently, there is no chance of a releasing operation occurring inadvertently against the will of the cyclist.

In the speed control system according to the present invention, as described above, the change speed device may be shifted in positive and negative directions by operating the single control member in opposite directions. This control member may be situated in a position to operate easily and reliably. Since only one control member is adequate, not only may the control member be in the form of a shift lever attached to the handlebar, but a handgrip itself may readily be adapted to act as the control member.

In a preferred embodiment of the invention, the control member has a locus of movement from the first shift end to the second shift end lying substantially on a single plane. This feature further improves operability of the control member, and simplifies its construction.

In a further preferred embodiment of the invention, the release element is connectable to the take-up device to transmit a force in the wire winding direction directly or indirectly to the take-up device, and the urging device is operable to urge the take-up device in the wire winding direction through the release element. This construction achieves the additional advantage of supplying an auxiliary force to lighten the change speed operation in the wire winding direction.

Other features and advantages of the present invention will be apparent from the description of the preferred embodiments to be had with reference to the drawings.

BRIEF DESCRIPTION OF THE DRAWINGS

FIG. 3a is a section taken on line 3—3 of FIG. 2, FIG. 3b is an enlarged fragmentary view of a portion of FIG. 3a.

DETAILED DESCRIPTION OF THE PREFERED EMBODIMENTS

A first embodiment of the present invention will be described next with reference to FIGS. 1 through 7.

Figure 1:
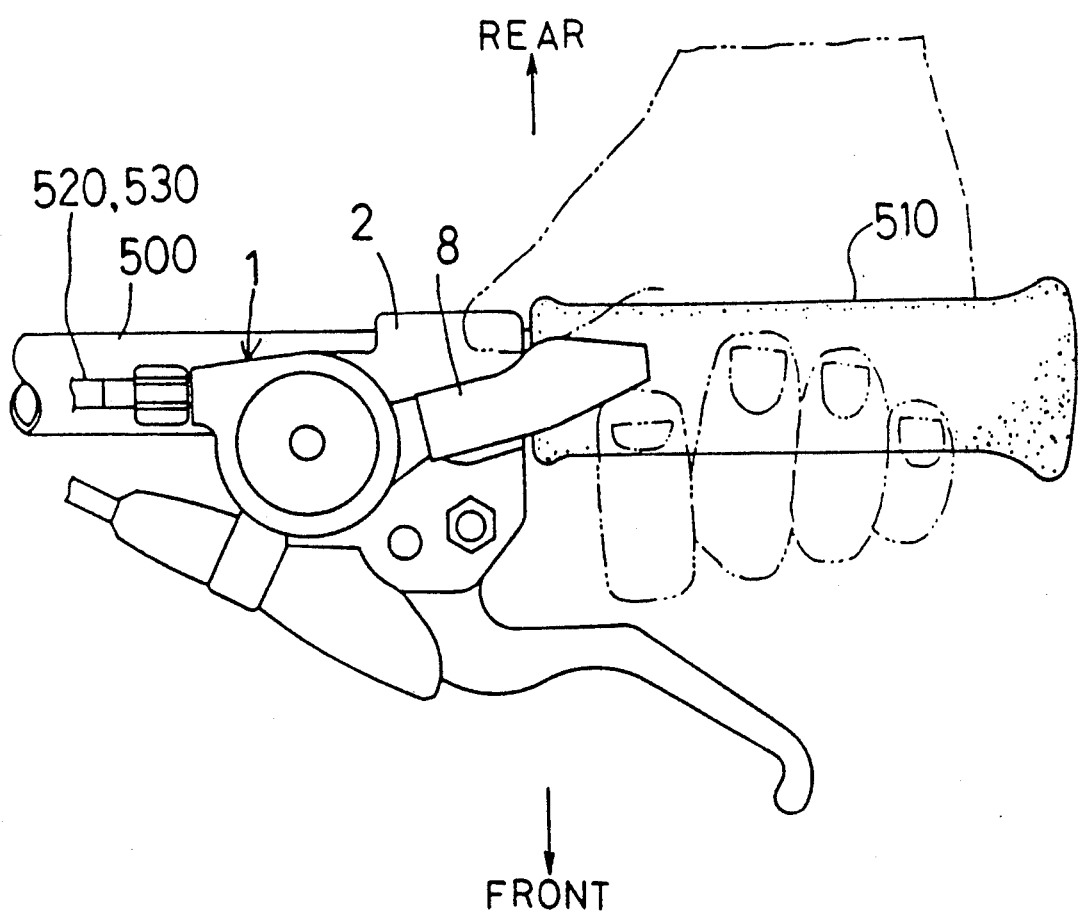
FIG. 1 is a bottom view of a speed control apparatus in a first embodiment of the present invention.

FIG. 1 shows a bicycle speed control apparatus 1 embodying the present invention and secured to a bottom position adjacent a grip 510 of a handlebar extending transversely of a bicycle. A shift lever 8 extends substantially along an undersurface of the grip 510 to be pivotable in the fore and aft direction of the bicycle. When the shift lever 8 is pressed by a thumb of the cyclist to pivot forward from home position to a second shift end, a change speed wire 520 extending from a rear derailleur is wound up to effect change speed in a positive direction. When the shift lever 8 is pressed by a first finger of the cyclist to pivot rearward from the home position to a first shift end, the change speed wire 520 is unwound to effect change speed in a negative direction. Numeral 2 denotes a brake lever bracket acting also as a mounting device for the speed control apparatus 1. The change speed wire 520 is an inner wire of a release cable, which is surrounded by an outer sleeve 530.

Figure 2:
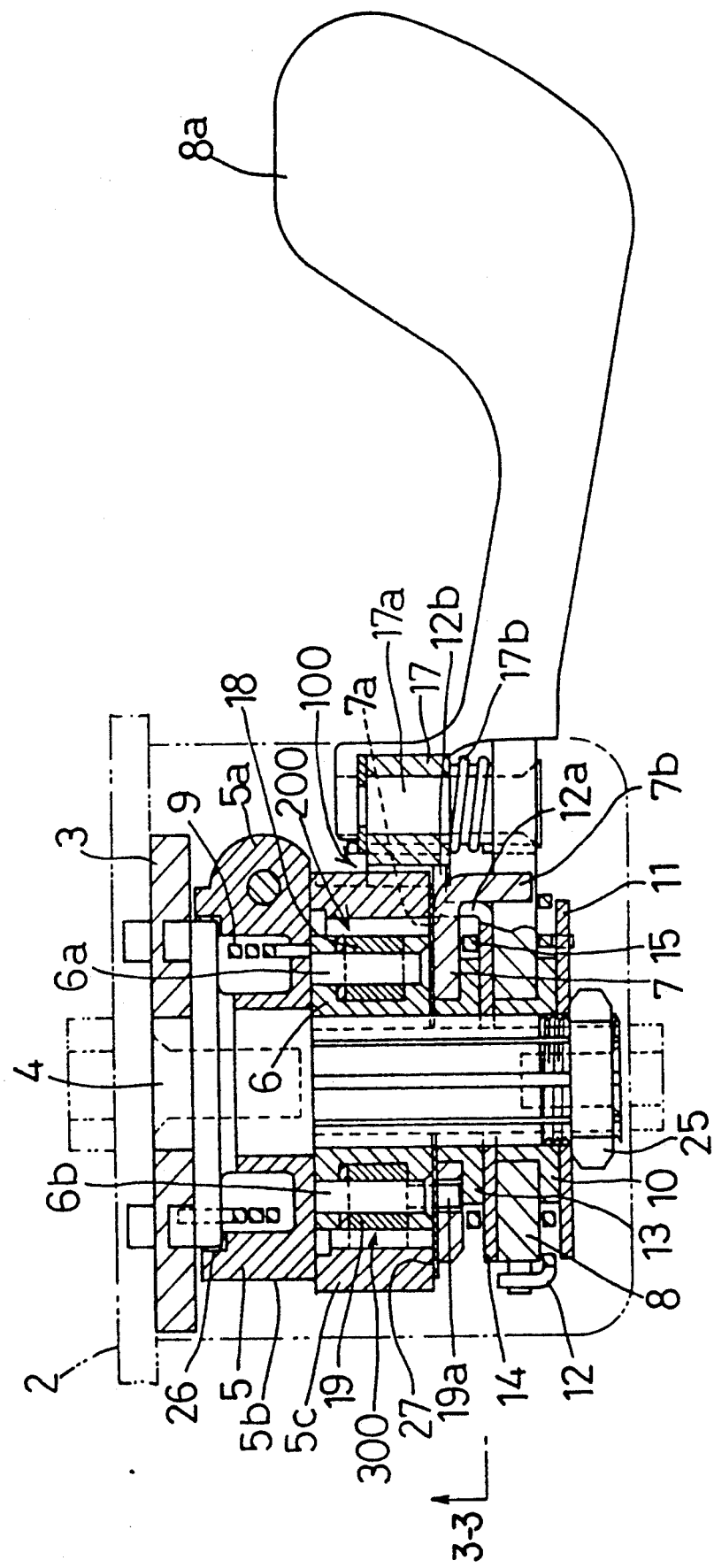
FIG. 2 is a view in vertical section of the apparatus shown in FIG. 1.

As shown in FIG. 2, the change speed apparatus 1 includes a stationary member 3 fixed to the bracket 2 which is shown only in outline described by a phantom line, and a support shaft 4 extending downwardly from the stationary member 3. The support shaft 4 carries a take-up reel 5 for winding the wire 520 thereon, a pawl supporting sleeve 6, a release element 7 and the shift lever 8 coaxially arranged in the stated order. The support shaft 4 is formed as a spline shaft not rotatable relative to the stationary member 3.

As shown in FIG. 2, the take-up reel 5 includes a wire engaging section 5a and a wire winding section 5b formed peripherally thereof. The take-up reel 5 is rotatable relative to the support shaft 4, and urged in a wire unwinding direction by a first spring 9 mounted between the take-up reel 5 and stationary member 3. Further, the take-up reel 5 includes a bush 5c as an integral part thereof surrounding the support shaft 4.

The shift lever 8 is pivotably supported at a proximal end thereof on the support shaft 4 through a spacer 10. The shift lever 8 is urged in the wire unwinding direction by a second spring 12 relative to a first stopper plate 11 mounted on the support shaft 4 not to be rotatable relative thereto. The shift lever 8 includes a plastic tab 8a formed on a distal end thereof.

Figure 3:
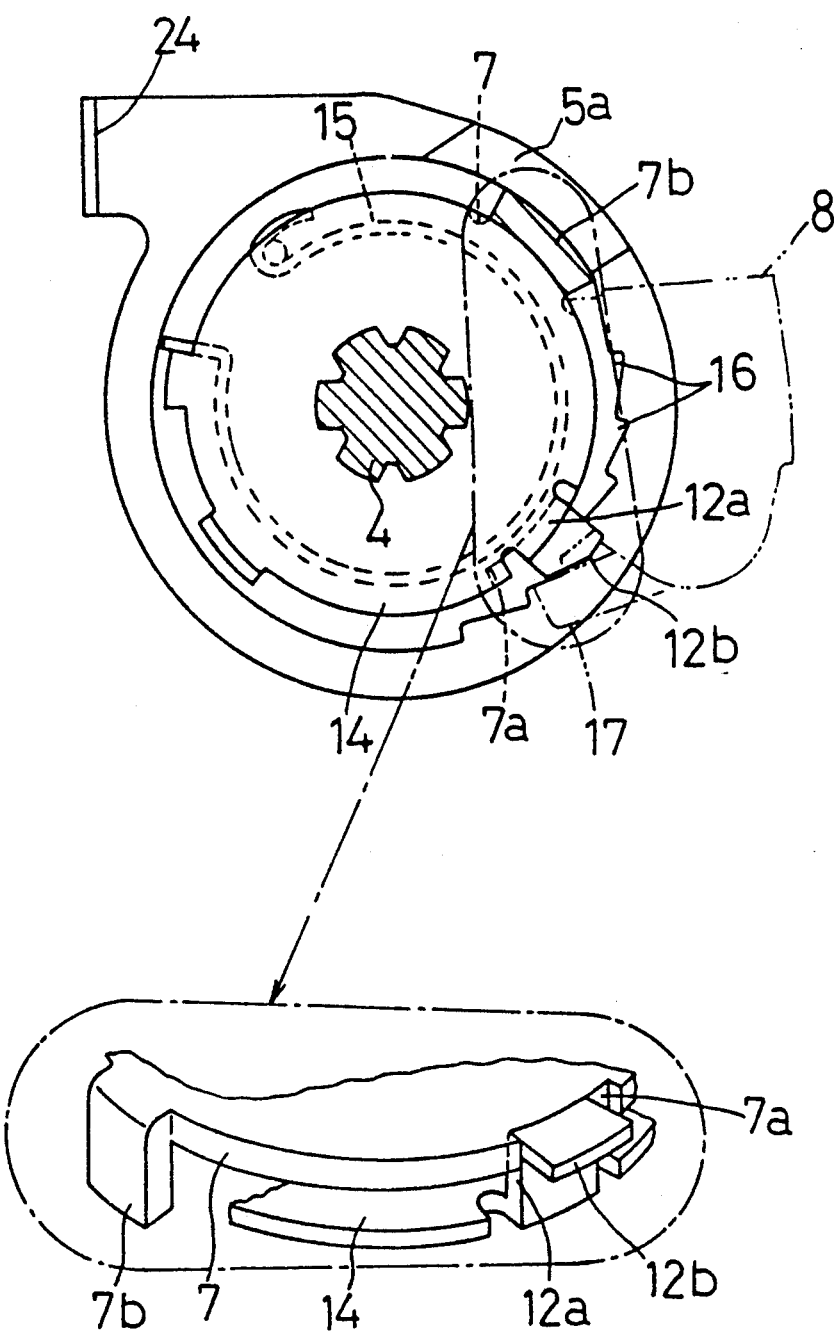

As shown in FIGS. 2 and 3, the release element 7 is rotatably supported on the support shaft 4 through a spacer 13. The release element 7 is urged in the wire winding direction by a third spring 15 relative to a second stopper plate 14 mounted on the support shaft 4 not to be rotatable relative thereto. As shown in FIGS. 3a and 3b and particularly as shown in FIG. 3b which is an enlarged fragmentary view therein seen from above, the release element 7 defines a stopper recess 7a in a peripheral position thereof for receiving a stopper projection 12a extending from the second stopper plate 14 to limit a range of rotation of the release element 7. Further, the release element 7 includes a positioning projection 7b extending from a peripheral position thereof for contacting the shift lever 8 to determine the home position of the lever 8.

The shift lever 8 is operatively connected to the take-up reel 5 through a one-way transmission device 100 as shown in FIGS. 2 and 3. The one-way transmission device 100 includes a plurality of one-way teeth 16 defined peripherally of the bush 5c of the take-up reel 5, a one-way pawl 17 pivoted to a pin 17a connected to the shift lever 8 for engaging the teeth 16, and a spring 17b for urging the one-way pawl 17 to an engaging position. With this one-way transmission device 100, when the shift lever 8 is turned in the wire winding direction, the take-up reel 5 is rotated in the same direction, the shift lever 8 being capable of returning in the wire unwinding direction independently of the take-up reel 5. The stopper projection 12a extending from the second stopper plate 14 includes a guide portion 12b for guiding the one-way pawl 17 in disengaging from the one-way teeth 16 when the shift lever 8 is in the home position.

Figure 4:
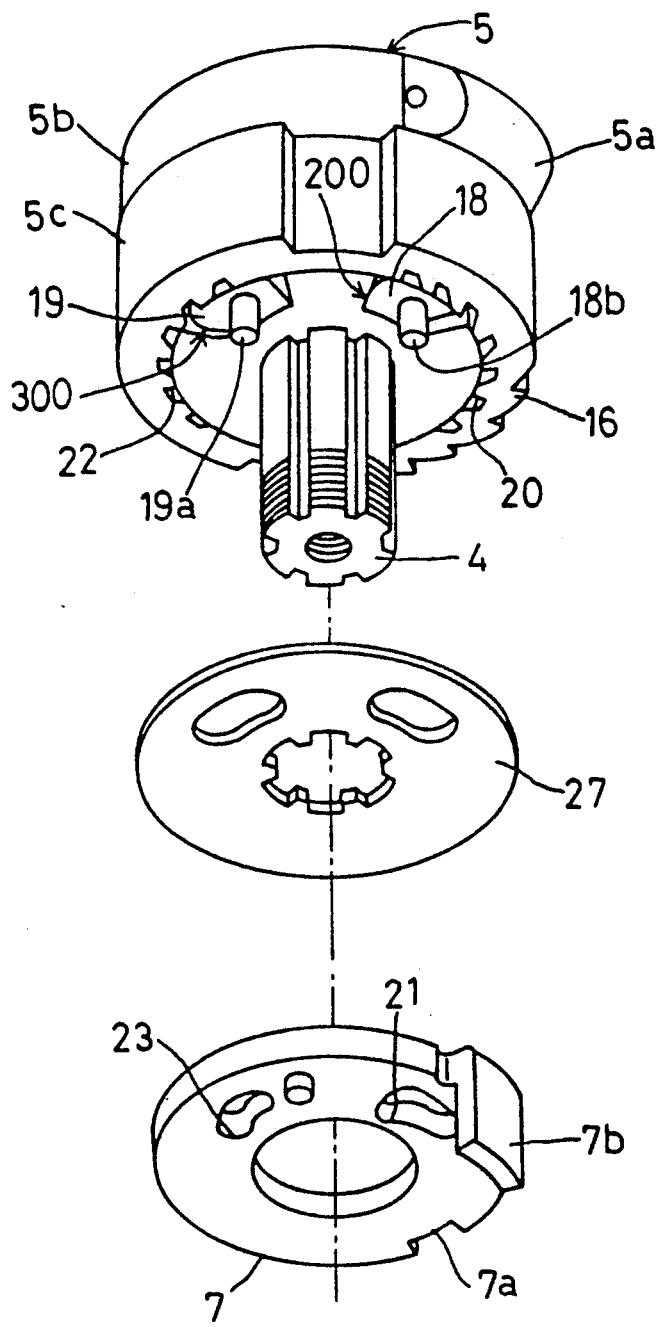
FIG. 4 is an exploded view showing principal components of the apparatus shown in FIG. 1, FIGS. 5a, 5b through 7 are views in cross section showing different operative states of the apparatus shown in FIG. 1.

As shown in FIGS. 2, 4 and 5, a position retaining device 200 includes a position retaining pawl 18 pivoted to a pawl shaft 6a extending parallel to the support shaft 4 from the pawl supporting sleeve 6 mounted on the support shaft 4, and position retaining teeth 20 defined on an inside peripheral wall of the bush 5c for engagement with the pawl 18.

A restricting device 300, which will be described later, is a mirror image of the position retaining device 200, and includes a restricting pawl 19 pivoted to a pawl shaft 6b extending from the pawl supporting sleeve 6, and restricting teeth 22 defined on an inside peripheral wall of the bush 5c for engagement with the pawl 19.

The take-up reel 5 is retained by the position retaining device 200 in stagewise stopping positions depending on winding lengths of the wire 520. The position retaining pawl 18 is urged by a pawl spring 18a to an engaging position. The position retaining pawl 18 and position retaining teeth 20 have an engaging structure and pawl shaft location determined so as to allow rotation in the wire winding direction of the take-up reel 5 by operation of the shift lever 8, and to prevent backward rotation in the wire unwinding direction of the take-up reel 5 and retain the take-up reel 5 in the stopping positions.

The position retention by the position retaining device 200 may be canceled by turning the shift lever 8 in the wire unwinding direction beyond the home position. The first shift end mentioned hereinbefore is an end of shift of the shift lever 8 in the unwinding direction from the home position, while the second shift end is an end of shift thereof in the winding direction from the home position. In this embodiment, the shift lever 8 in the shift from the first shift end to the second shift end describes a shifting locus substantially on a single plane, and is operable linearly.

The take-up reel 5 retained in position by the position retaining device 200 is releasable by a retention canceling device 400. As shown in FIGS. 2, 4 and 5, the retention canceling device 400 includes a projection 18b extending from the position retaining pawl 18, and the release element 7 defining a cam bore 21 for receiving the projection 18b. When the release element 7 is rotated in the wire unwinding direction by the shift lever 8, the cam bore 21 guides the projection 18b to forcibly swing the position retaining pawl 18 out of engagement with the position retaining teeth 20. The take-up reel 5 freed by the retention canceling device 400 rotates in the wire unwinding direction under the force of the first spring 9.

The rotation in the unwinding direction of the take-up reel 5 during this unwinding operation is limited to a predetermined amount by the restricting device 300. The restricting device 300 includes, besides the restricting pawl 19 and restricting teeth 22, a projection 19a extending from the restricting pawl 19, and a restricting cam bore 23 defined in the release element 7 for receiving the projection 19a. When the release element 7 is caused by the shift lever 8 to rotate in the wire unwinding direction, the restricting cam bore 23 guides the projection 19a to forcibly swing the restricting pawl 19 for engagement with one of the restricting teeth 22. In this way, the restricting pawl 19 is moved into a locus for engaging one of the restricting teeth 22 before the position retention by the position retaining device 200 is canceled. Consequently, the rotation in the unwinding direction of the take-up reel 5 is limited to less than one pitch of the position retaining teeth 20.

In FIG. 2, numeral 24 denotes a bearing for the outer sleeve 530. Numeral 25 denotes a lock nut for retaining the various components on the support shaft 4. Numerals 26 and 27 denote washers.

The way in which the change speed apparatus 1 constructed as above operates will be described next with reference to FIGS. 5 through 7. These drawings show sections of the apparatus 1 of FIG. 1 only in a way suited to description of the functions, and are not correct drawings in the strict meaning of graphics, from which components unnecessary to the description are omitted. For constructions of the various components, reference should be made to the exploded view in FIG. 4.

Figure 6:
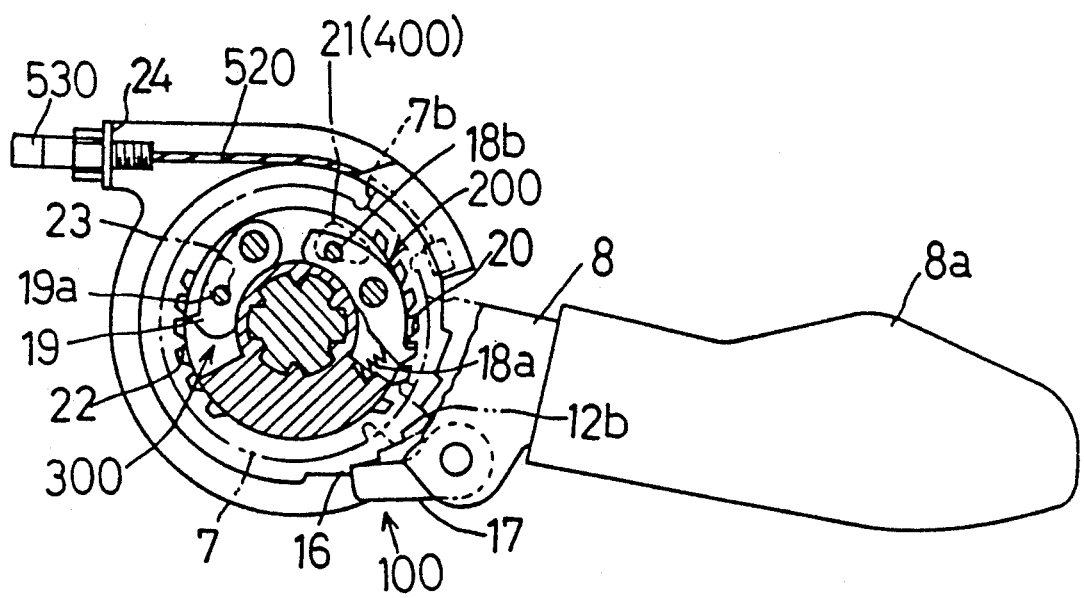

Referring to FIGS. 5 and 6, change speed in the wire winding direction is effected by pressing the shift lever 8 toward the second shift end, i.e. downward in the drawings, with a thumb. At this time, a force is transmitted through the one-way transmission device 100 to rotate the take-up reel 5 in the winding direction, i.e. clockwise in the drawings. When the cyclist stops pressing the shift lever 8 with the thumb, the take-up reel 5 stops in position by the action of the position retaining device 200, whereas the shift lever 8 returns independently of the take-up reel 5 by the freeing action of the one-way transmission device 100 and stops at the home position by contact with the positioning projection 7b. It is of course possible to effect multistep change speed in a single operation by shifting the shift lever 8 a corresponding amount.

Figure 7:
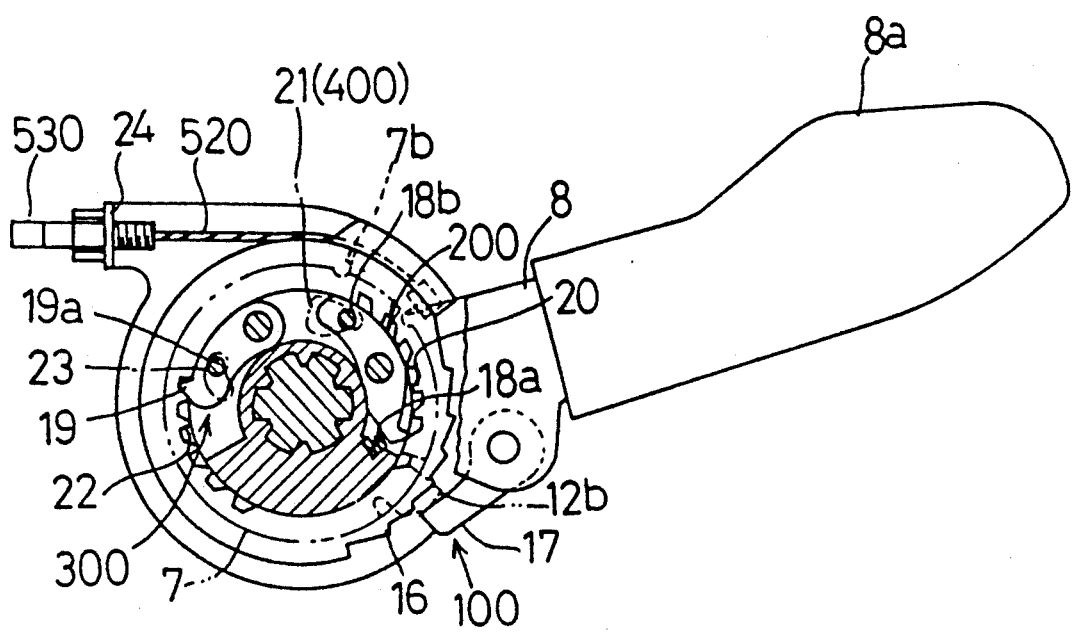

Referring to FIG. 7, change speed in the wire unwinding direction is effected by pressing the shift lever 8 toward the first shift end, i.e. upward in the drawing, with a first finger. At this time, the release element 7 having the positioning projection 7b rotates in the unwinding direction to cancel the action of the position retaining device 200 and to operate the restricting device 300 to limit the backward rotation in the unwinding direction of the take-up reel 5 within one pitch of the position retaining teeth 20. When the cyclist stops pressing the shift lever 8 with the first finger, the release element 7 returns in the winding direction under the force of the third spring 15 to cancel the action of the restricting device 300 and to cause the position retaining device 200 to retain the take-up reel 5 in a position one step backward in the unwinding direction. At the same time, the shift lever 8 returns to the home position.

A second embodiment of the present invention will be described next with reference to FIGS. 8 through 14. As distinct from the first embodiment, this embodiment has the control member in the form of a grip 510 rather than the shift lever. The construction of the restricting device is also different in this embodiment.

Figure 8:
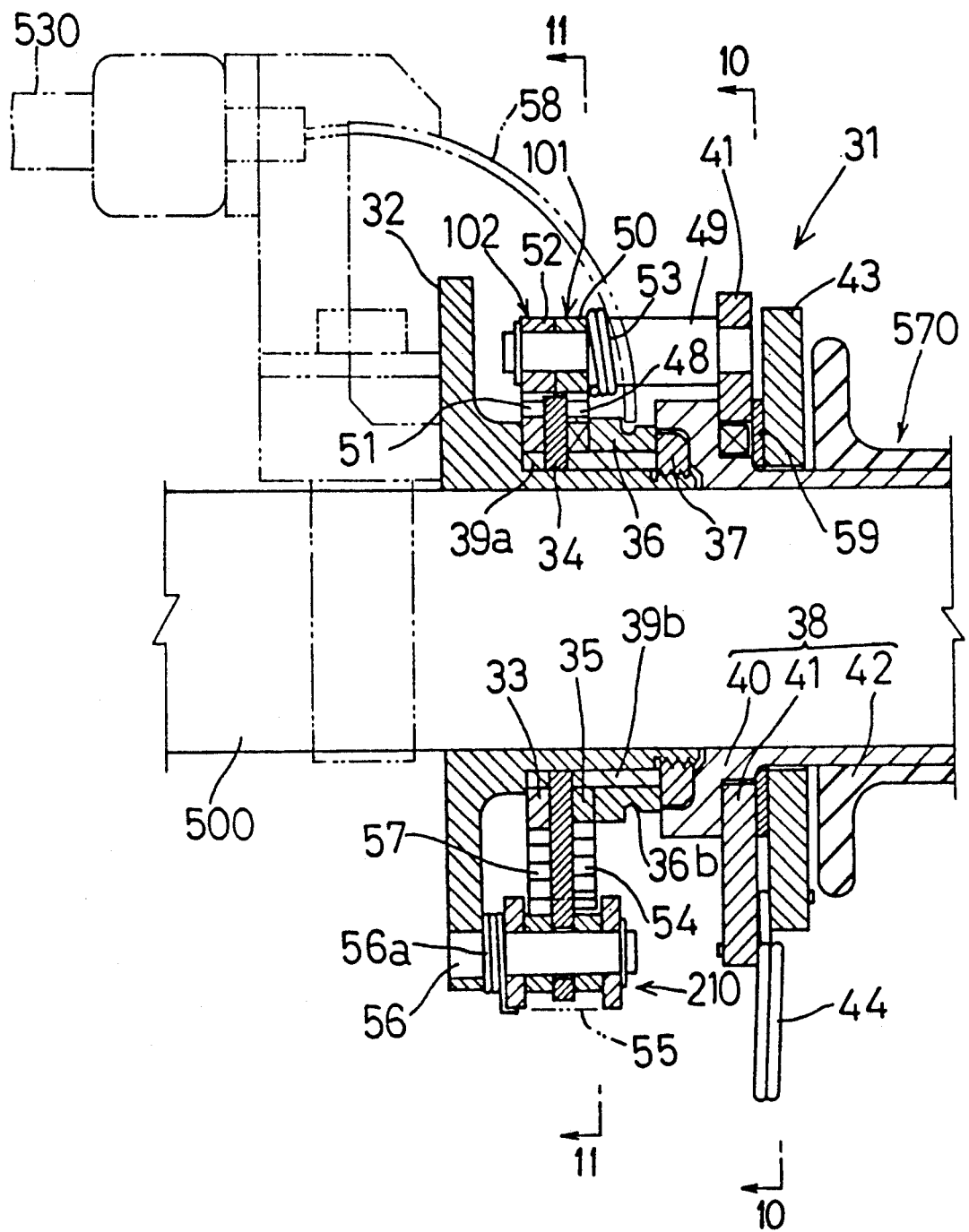
FIG. 8 is a view in vertical section taken along a handlebar and showing a speed control apparatus in a second embodiment of the present invention.
Figure 9:
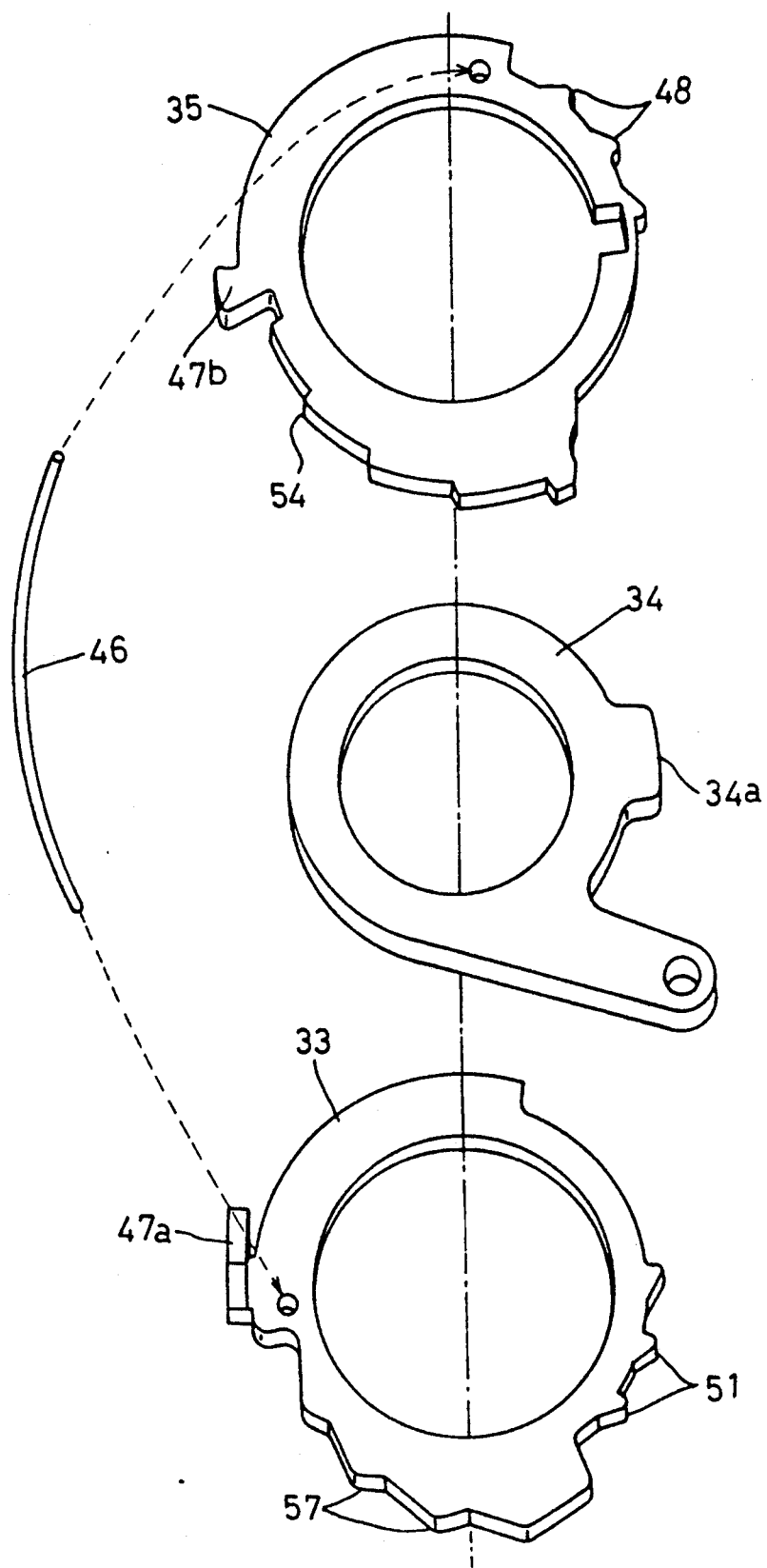
FIG. 9 is an exploded view showing principal components of the apparatus shown in FIG. 8.

As shown in FIGS. 8 and 9, a speed control apparatus 1 in this embodiment includes a first stationary member 32 mounted coaxially with a handlebar 500, and a release element 33, a guide plate 34, a feed plate 35 and a take-up reel 36 fitted on the first stationary member 32 in the stated order and retained in position by a lock ring 37. Further, a control member 38 is rotatably fitted from an extreme end of the handlebar 500. Numerals 39a and 39b in FIG. 8 denote bushes for allowing rotation relative to the first stationary member 32 of the components except the guide plate 34 which is fitted on the first stationary member 32 not to be rotatable relative thereto.

Figure 10:
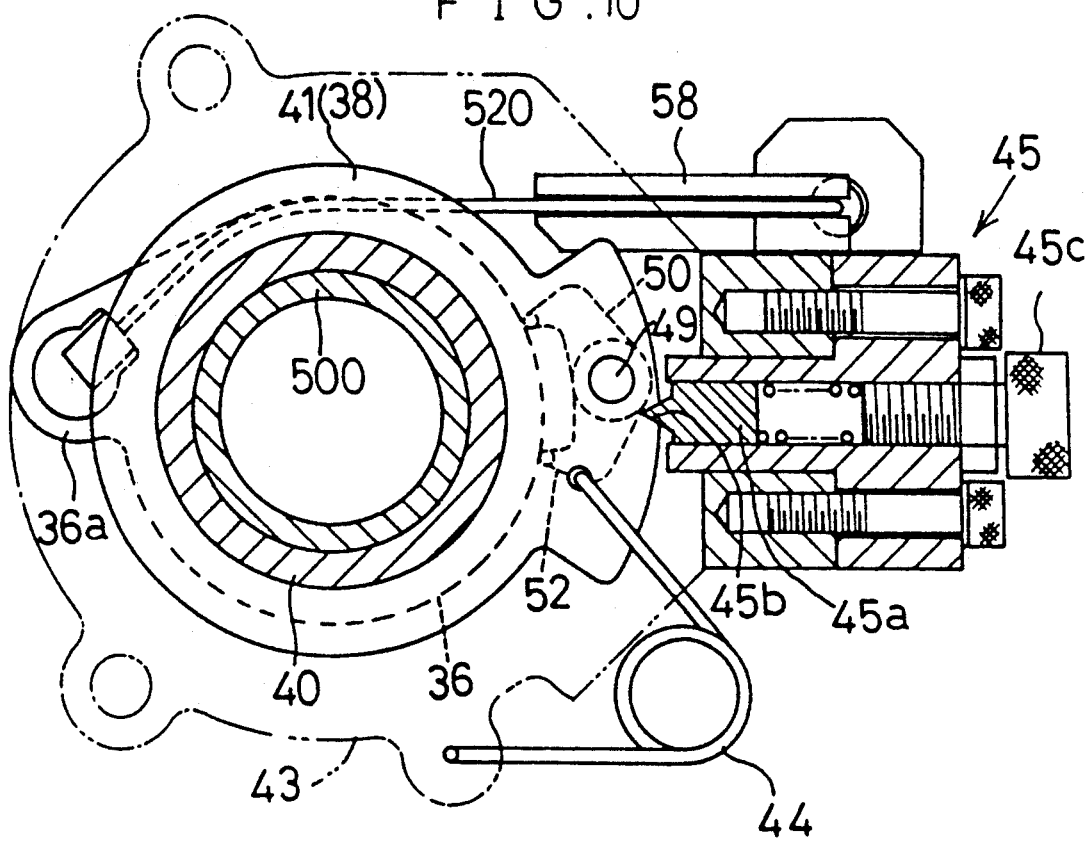
FIG. 10 is a section taken on line 10—10 of FIG. 8.

As shown in FIG. 8, the control member 38 includes a handle collar 40 rotatably mounted on the handlebar 500, a drive plate 41 fitted on the collar 40 not to be rotatable, and a grip rubber 42 fitted on the collar 40. The handle collar 40 is retained in position by a second stationary member 43 rigidly connected to the first stationary member 32. As shown in FIG. 10, the control member 38 is urged by a lever-shaped neutralizing spring 44 mounted between the drive plate 41 and second stationary member 43, to return to home position after being operated in a wire winding direction, i.e. toward a second shift position, or in a wire unwinding direction, i.e. toward a first shift position. For the control member 38 to stop at the home position with a click, the second stationary member 43 carries a clicking mechanism 45 including a positioning projection 45a movable relative to and urged toward the drive plate 41, and a positioning recess 45b defined in the drive plate 41 for engagement with the projection 45a when the control member 38 is in the home position. A clicking resistance is adjustable by advancing or retracting an adjuster screw 45c.

Figure 11:
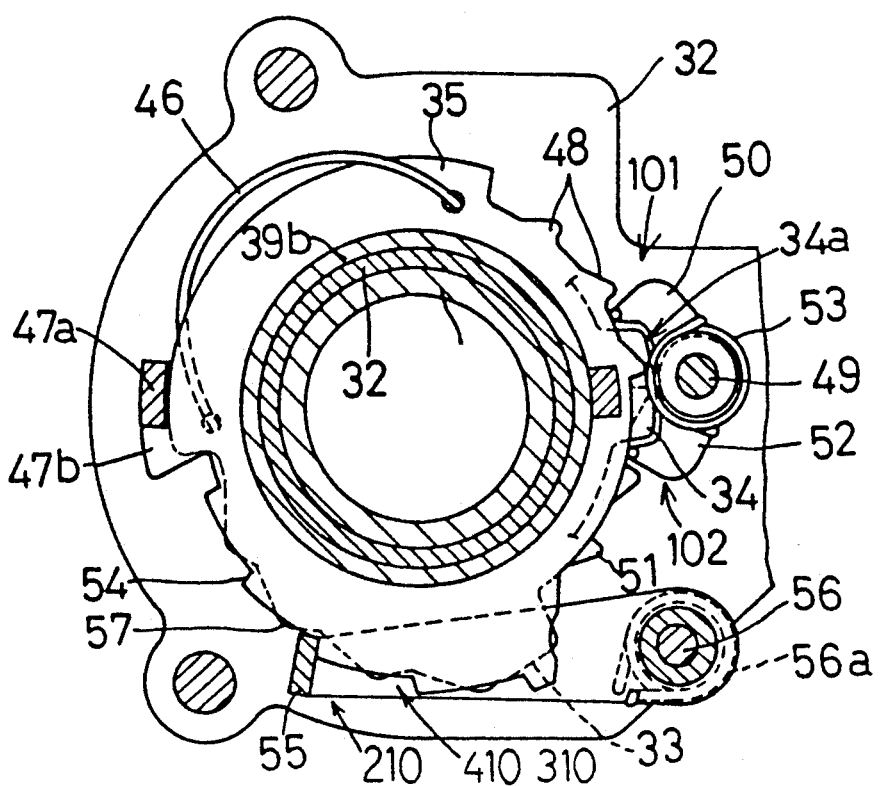
FIG. 11 is a section taken on line 11—11 of FIG. 8, FIGS. 12 through 15 are views similar to FIG. 11 and showing different operative states of the apparatus shown in FIG. 8.

As shown in FIG. 10, the take-up reel 36 includes a wire engaging section 36a and a wire winding section 36b formed peripherally thereof. The take-up reel 36 is rotatable with the feed plate 35. As shown in FIG. 11, a return spring 46 is provided between the feed plate 35 and release element 33 for urging the release element 33 in the wire winding direction when the feed plate 35 is fixed, and urging the feed plate 35 in the wire unwinding direction when the release element 33 is fixed. Further, the release element 33 and feed plate 35 include stoppers 47a and 47b, respectively, for limiting rotation in the winding direction of the release element 33 relative to the feed plate 35 at a predetermined position.

As shown in FIGS. 9 through 11, the drive plate 41 of the control member 38 is operatively connected to the feed plate 35 through a first one-way transmission device 101. Further, the drive plate 41 is engageable with a second one-way transmission device 102 for transmitting drive to the release element 33. The first and second one-way transmission devices 101 and 102 transmit the drive in opposite directions. The first one-way transmission device 101 includes a plurality of first one-way teeth 48 defined peripherally of the feed plate 35, and a first one-way pawl 50 pivoted to a pawl supporting shaft 49 extending from the drive plate 41 for engaging the teeth 48. The first one-way pawl 50 is urged in a direction to engage the teeth 48. When the control member 38 is rotated toward the second shift end to wind the wire, the first one-way transmission device 101 causes the take-up reel 36 to rotate with the feed plate 35 in the wire winding direction. Subsequently, the control member 38 returns to the home position independently of the feed plate 35 by the freeing action of the first one-way transmission device 101.

The second one-way transmission device 102 includes a plurality of second one-way teeth 51 defined peripherally of the release element 33, and a second one-way pawl 52 pivoted to the pawl supporting shaft 49 for engaging the releasing teeth 51. The second one-way pawl 52 is urged in a direction to engage the teeth 51. When the control member 38 is rotated from the home position toward the first shift end to unwind the wire, the second one-way transmission device 102 causes the release element 33 to rotate in the wire unwinding direction in order to cancel retention in position of the take-up reel 36 as will be described in detail later. The control member 38 is capable of returning to the home position independently of the release element 33 by the freeing action of the second one-way transmission device 102.

For selective operation of the first and second one-way transmission devices 101 and 102, the guide plate 34 includes a guide portion 34a disposed between the first and second one-way pawls 50 and 52 to separate one of the pawls from the first or second one-way teeth 48 or 51. Numeral 53 in the drawings denotes a torsion coil spring for acting on both the first and second one-way pawls 50 and 52.

The take-up reel 36 rotatable with the feed plate 35 is retained by a position retaining device 210 in stagewise stopping positions depending on winding lengths of the wire 520. As shown in FIGS. 9 and 11, the position retaining device 210 includes a plurality of position retaining teeth 54 defined peripherally of the feed plate 35, and a position retaining pawl 55 pivoted to a pin extending from the first stationary member 32 for engaging the retaining teeth 54. The pawl 55 is urged toward an engaging position by a pawl spring 56a. The position retaining teeth 54 and pawl 55 have an engaging structure and positional relationship with the pin 56 to allow rotation in the wire winding direction of the take-up reel 36 by operation of the control member 38, and to prevent backward rotation in the wire unwinding direction of the take-up reel 36.

The position retention by the position retaining device 210 may be canceled by rotating the control member 38 in the wire unwinding direction from the home position to the first shift end. The cancellation is achieved by a retention canceling device 410 which includes, besides the second one-way transmission device 102 and release element 33, a plurality of teeth 57 formed peripherally of the release element 33 and in staggered relations with the position retaining teeth 54 to act as retention canceling cams. When the release element 33 is rotated in the wire unwinding direction, the retention canceling teeth 57 forcibly swing the position retaining pawl 55 out of engagement with the position retaining teeth 54. The take-up reel 36 freed by this disengagement rotates in the wire unwinding direction under the force of the return spring 46.

The rotation in the unwinding direction of the feed plate 35, and thus the take-up reel 36, during this unwinding operation is limited to a predetermined amount by a restricting device 310. The restricting device 310 comprises a construction in which, as shown in FIGS. 9 and 11, the position retaining teeth 54 and retention canceling cams 57 have radially outwardly increasing heights in the wire unwinding direction, respectively, and in which each retention canceling cam 54 is higher than the position retaining tooth 54 engaged prior to a wire unwinding operation and lower than a next position retaining tooth 54 in the unwinding direction. Consequently, the rotation in the unwinding direction of the take-up reel 36 resulting from one unwinding operation is limited to one pitch of the position retaining teeth 54.

In FIG. 8, numeral 58 denotes a guide element for bending the wire 520 ninety degrees to follow the handlebar 500. Numeral 59 denotes a slide bush for smoothing rotation of the control member 38 relative to the second stationary member 43.

The way in which the change speed apparatus 31 in the second embodiment constructed as above operates will be described next with reference to FIGS. 11 through 15. These drawings show sections of the apparatus of FIG. 8 only in a way suited to description of the functions, and are not correct drawings in the strict meaning of graphics, from which components unnecessary to the description are omitted. For constructions of the various components, reference should be made to the exploded view in FIG. 9.

Figure 12:
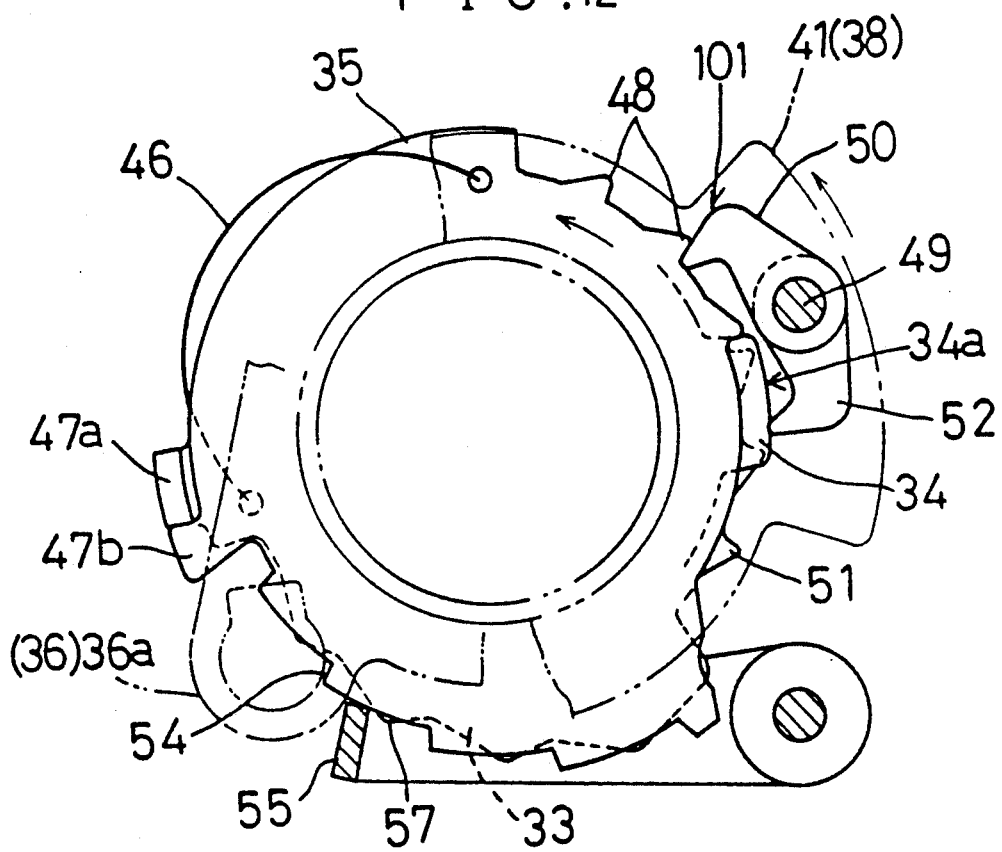
Figure 13:
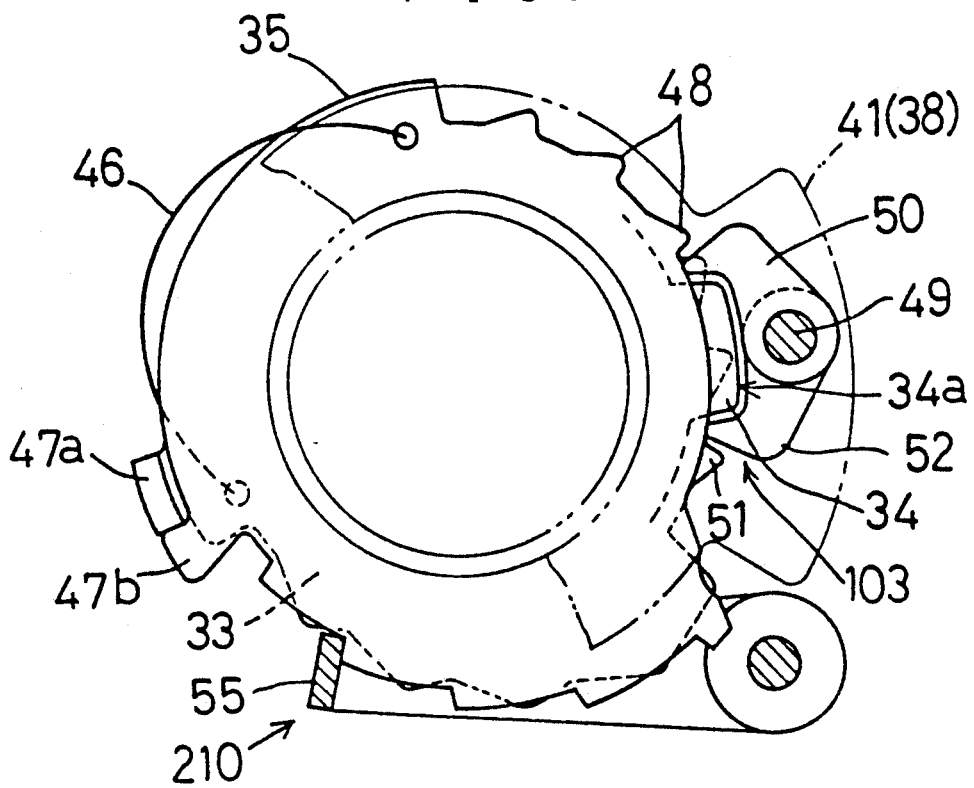

Change speed in the wire winding direction or positive direction is effected by holding the grip rubber 42 of the control member 38 and flexing the wrist in a direction to rotate the control member 38 from the home position to the second shift end. At this time, as shown in FIG. 12, a force is transmitted through the first one-way transmission device 101 to rotate the take-up reel 36 in the winding direction, i.e. counterclockwise in the drawing. When the cyclist stops applying the rotating force to the control member 38, as shown in FIG. 13, the take-up reel 36 stops in position by the action of the position retaining device 210. Then, the control member 38 returns independently of the take-up reel 36 to the home position with the clicking mechanism 45 engaged, under the urging force of the lever spring 44 and by the freeing action of the first one-way transmission device 101 and with the second one-way pawl 52 riding on the guide portion 34a.

Figure 14:
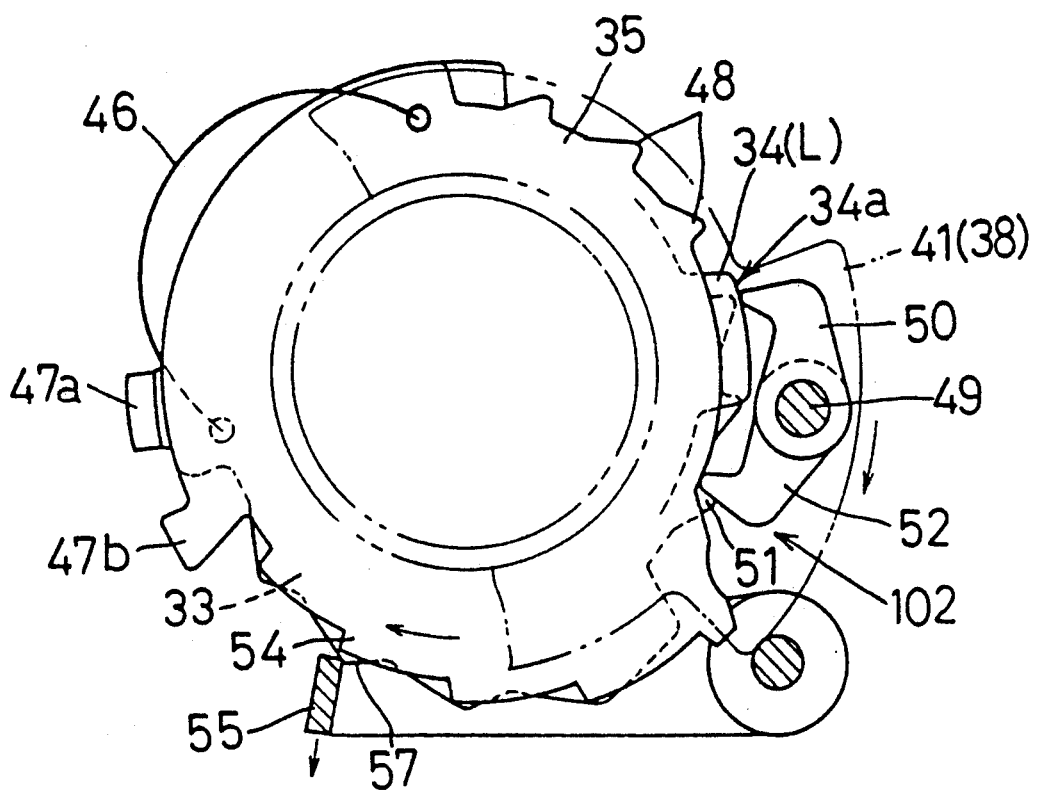
Figure 15:
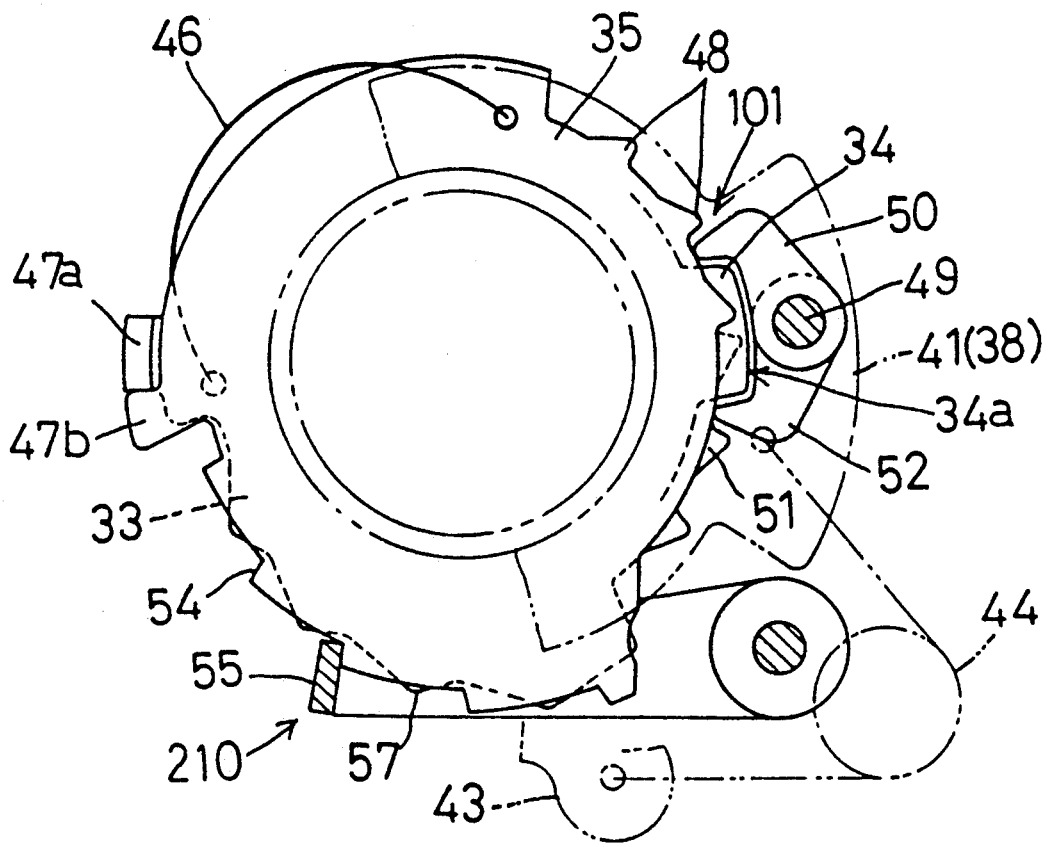

Change speed in the wire unwinding direction or negative direction is effected by holding the grip rubber 42 and flexing the wrist in the opposite direction to rotate the control member 38 from the home position to the first shift end. At this time, as shown in FIG. 14, a force is transmitted through the second one-way transmission device 102 to rotate the release element 33 in the unwinding direction. The position retaining pawl 55 is thereby lifted to cancel the position retention by the position retaining device 210. The take-up reel 36 rotates in the unwinding direction until the stoppers 47a and 47b contact each other since the release element 33 is connected to the control member 38 and the feed plate 35 and take-up reel 36 are freed. The return spring 46 applies an urging force to rotate the take-up reel 36 in the unwinding direction. At the same time, the return movement of the take-up reel 36 is limited within one pitch of the position retaining teeth 54 by the restricting device 310, and position retention is effected again by the position retaining device 210. When the cyclist stops applying the rotating force to the control member 38, as shown in FIG. 15, the control member 38 returns independently of the release element 33 to the home position with the clicking mechanism 45 engaged, under the urging force of the lever spring 44 and by the freeing action of the second one-way transmission device 102 and with the first one-way pawl 50 riding on the guide portion 34a. The release element 33 does not rotate in the unwinding direction since the feed plate 35 is fixed, the return spring 46 urges the release element 33 in the winding direction, and the stoppers 47a and 47b contact each other to limit rotation of the release element 33. This avoids an inadvertent operation of the retention canceling device 410.

A third embodiment of the present invention will be described next with reference to FIGS. 16 through 21.

Figure 16:
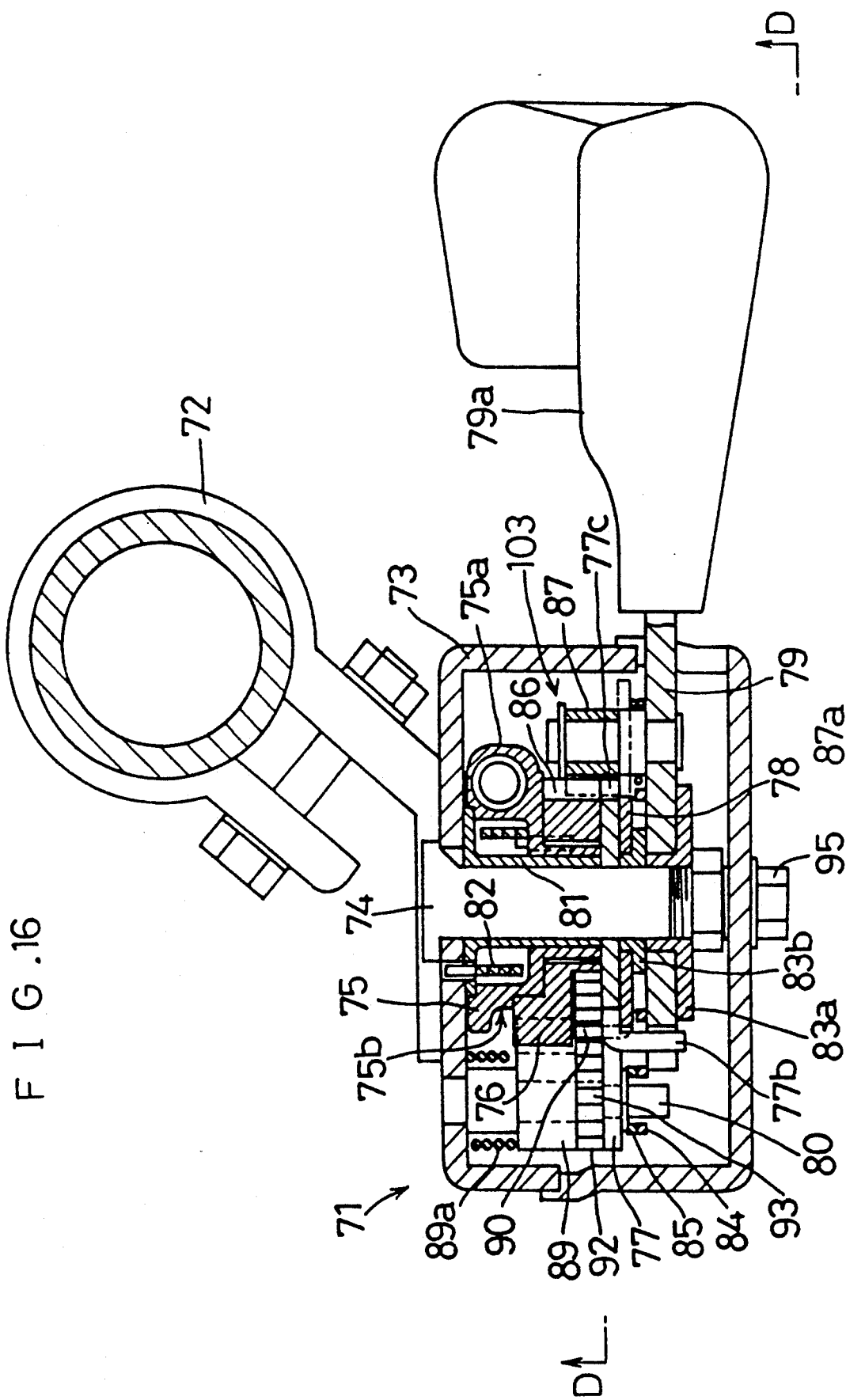
FIG. 16 is a view in vertical section of a speed control apparatus in a third embodiment of the present invention.

As shown in FIG. 16, a speed control apparatus 71 in this embodiment has a shift lever 79 extending from a mounting bracket 72 along an undersurface of a grip as in the first embodiment.

The change speed apparatus 71 includes a stationary member 73 fixed to the bracket 72, a support shaft 74 extending downwardly from the stationary member 3. The support shaft 74 carries a take-up reel 75, a position retainer 76 fitted on the take-up reel 75 not to be rotatable relative thereto, a fixed plate 77, a release element 78 and the shift lever 79 coaxially arranged in the stated order. The fixed plate 77 is connected to the stationary member 73 through a pawl shaft 80 to be locked against rotation. The pawl shaft 80 supports a position retaining pawl 89 and a restrictor 92 (which will be described later) to be rotatable together.

Figure 17:
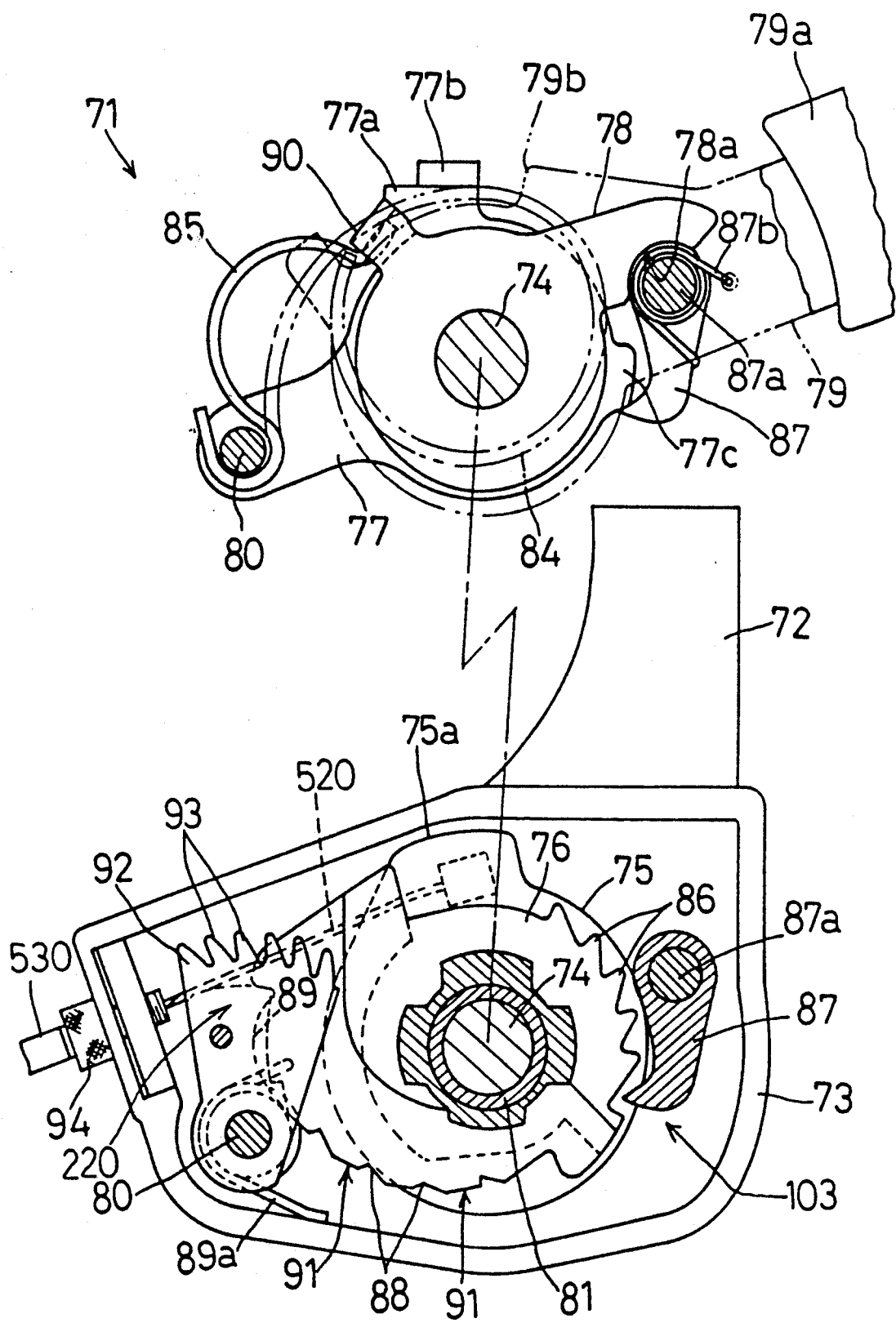
FIG. 17 is a partly exploded section taken on line D of FIG. 16.
Figure 18:
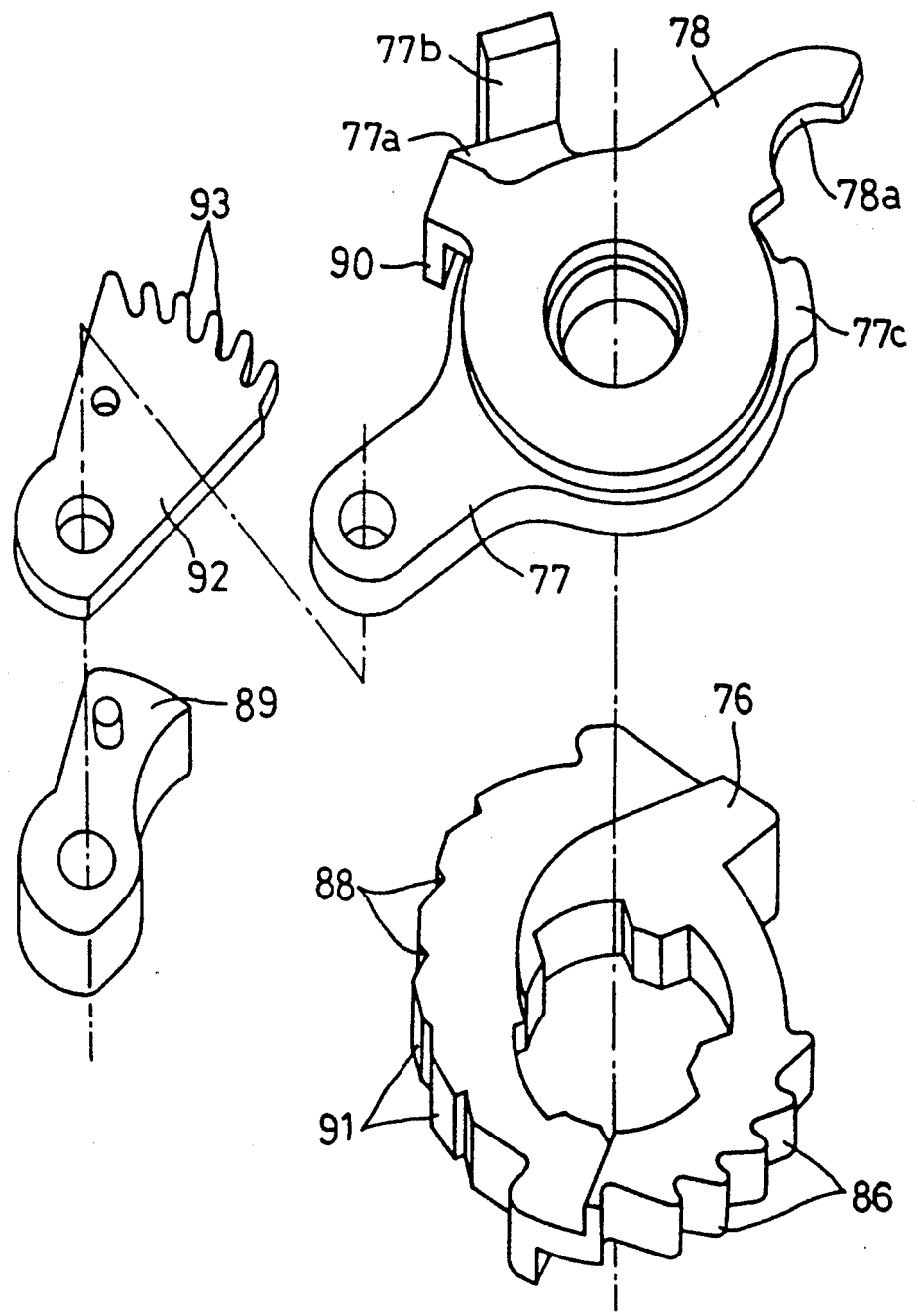
FIG. 18 is an exploded view showing principal components of the apparatus shown in FIG. 16, and FIGS. 19 through 21 are views in cross section showing different operative states of the apparatus shown in FIG. 16.

As shown in FIGS. 16 through 18, the take-up reel 75 includes a wire engaging section 75a and a wire winding section 75b formed peripherally thereof. The take-up reel 75 is relatively rotatably mounted on the support shaft 74 through a sleeve 81, and urged in a wire unwinding direction by a first spring 82 mounted between the take-up reel 75 and stationary member 73. The fixed plate 77 includes a first rotation stopper projection 77a extending outwardly from a peripheral position thereof, and a second rotation stopper projection 77b extending downwardly from an outer end of the first rotation stopper projection 77a.

The shift lever 79 is pivotably supported at a proximal end thereof on the support shaft 74 through a spacer 83a. The shift lever 79 is urged in the wire unwinding direction by a second spring 84 mounted between the shift lever 79 and pawl shaft 80. The shift lever 79 includes a plastic tab 79a formed on a distal end thereof. Further, the shift lever 79 defines a recess 79b in the proximal end thereof for receiving the second rotation stopper projection 77b to limit pivotal movement of the shift lever 79 within a predetermined range.

As shown in FIGS. 16 through 18, the release element 78 is rotatably supported on the support shaft 74 through a spacer 83a. The release element 78 is urged in the wire winding direction by a third spring 85 relative to the pawl shaft 80. The release element 78 includes a restricting pawl 90 extending downwardly from a peripheral position thereof, which acts as part of a restricting device 320 described later. This pawl 90 contacts the first rotation stopper projection 77a to restrict the rotation in the wire winding direction of the release element 78 to a predetermined position. The release element 78 defines an extension for contacting a proximal portion of a pivot pin 87a attached to the shift lever 79 to restrict pivotal movement of the shift lever 79 from home position toward a first shift end. This is effective to positively determine the home position of the shift lever 79. Numeral 78a denotes a positioning section defined in the extension for this purpose.

The shift lever 79 is operatively connected to the position retainer 76 through a one-way transmission device 103 as shown in FIGS. 16 and 17. The one-way tranmission device 103 includes a plurality of one-way teeth 86 defined peripherally of the position retainer 76, a one-way pawl 87 pivoted to the pin 87a for engaging the teeth 86, and a spring 87b for urging the one-way pawl 87 to an engaging position. With this one-way transmission device 103, when the shift lever 79 is turned from the home position to a second shift end, i.e. in the wire winding direction, the take-up reel 75 is rotated in the same direction, the shift lever 79 being capable of returning to the home position independently of the take-up reel 75 and position retainer 76. The fixed plate 77 includes a guide portion 77c defined peripherally thereof for guiding the one-way pawl 87 in disengaging from the one-way teeth 86 when the shift lever 79 is in the home position.

The take-up reel 75 is retained by a position retaining device 220 in stagewise stopping positions depending on winding lengths of the wire 520. The position retaining device 220 includes a plurality of position retaining recesses 88 defined peripherally of the position retainer 76, and the position retaining pawl 89 mentioned hereinbefore for engaging the recesses 88. The pawl 89 is urged by a pawl spring 89a to an engaging position. The shapes and positional relationship of the recesses 88 and pawl 89 are determined so as to allow rotation in the wire winding direction of the take-up reel 75 by operation of the shift lever 79, and to prevent backward rotation in the wire unwinding direction of the take-up reel 75 and retain the take-up element 75 in the stopping positions.

The portion of the position retainer 76 defining the position retaining recesses 88 has a gradually increasing diameter in the wire winding direction. This feature and restricting surfaces 91 defined between adjacent position retaining recesses 88 (which will be described hereunder) constitute the restricting device 320.

The position retention by the position retaining device 220 may be canceled by turning the shift lever 79 in the wire unwinding direction from the home position toward the first shift end. The cancellation is achieved by a retention canceling device 420 which essentially includes the release element 78 defining the restricting pawl 90, and restricting teeth 93 defined on the restrictor 92 rotatable with the position retaining pawl 89 to be engageable with the restricting pawl 90. The retention canceling device 420 has such a function that, when the release element 78 is rotated in the wire unwinding direction by the shift lever 79, the restricting pawl 90 engages one of the restricting teeth 93 whereby the position retaining pawl 89 moves away from the position retaining recesses 91. The restricting device 320 has such a function that one of the restricting surfaces 91 contacts the position retaining pawl 89 whose movement is restricted by the engagement between the restricting pawl 90 and restricting tooth 93, to limit the rotation in the wire unwinding direction of the take-up reel 75 within one pitch of the position retaining recesses 88.

Numeral 94 in FIG. 17 denotes a bearing for an outer sleeve 530 fitted on the wire 520. Numeral 95 in FIG. 16 denotes a lock nut for retaining the various components on the support shaft 74.

The way in which the change speed apparatus 1 constructed as above operates will be described next with reference to FIGS. 19 through 21. These drawings show sections of the apparatus 1 of FIG. 16 only in a way suited to description of the functions, and are not correct drawings in the strict meaning of graphics, from which components unnecessary to the description are omitted. For constructions of the various components, reference should be made to the exploded view in FIG. 18.

Figure 19:
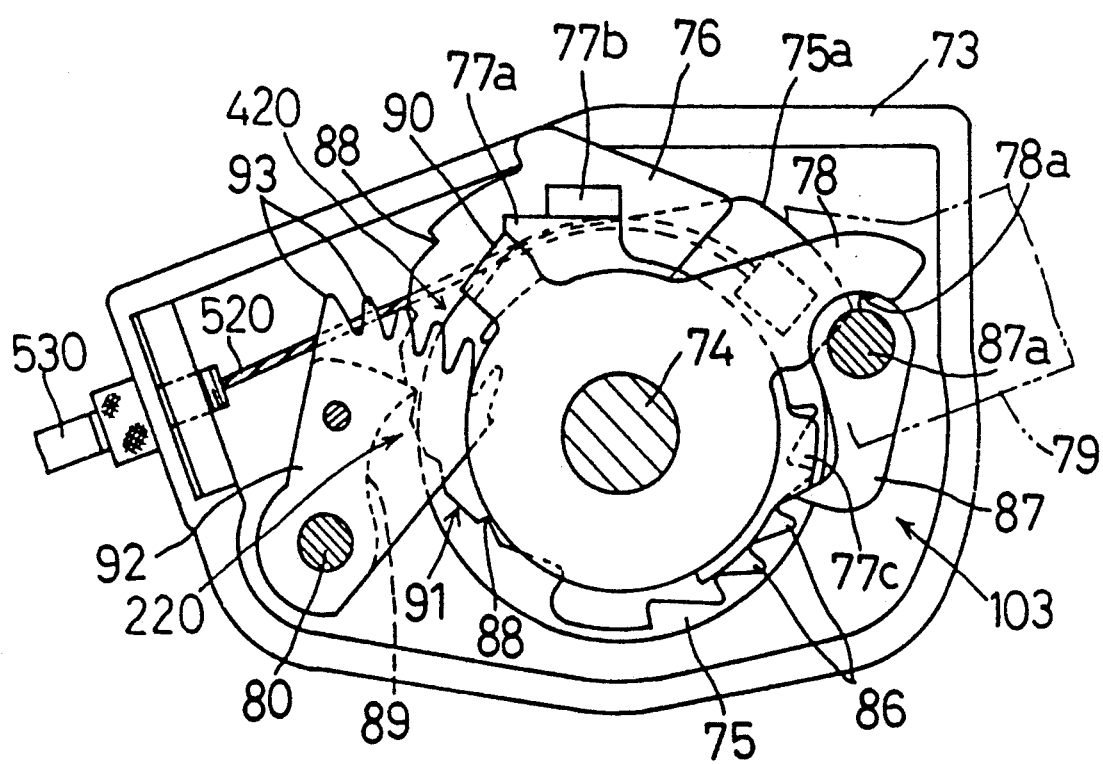
Figure 20:
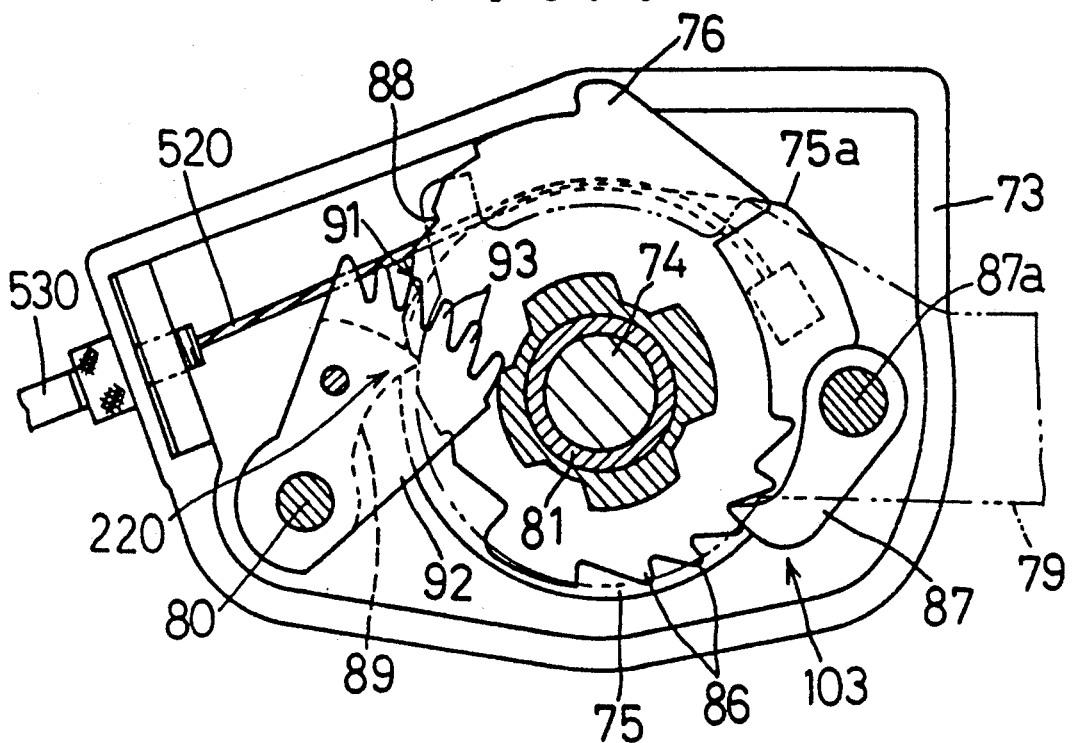

When the shift lever 79 in the position shown in FIG. 19 is pressed with a thumb from the home position toward the second shift end, i.e. clockwise in the drawing, to take up the wire, a force is transmitted through the one-way transmission device 103 to rotate the take-up reel 75 in the wire winding direction. When the cyclist stops pressing the shift lever 79 with the thumb, the take-up reel 75 stops in position by the action of the position retaining device 220. Subsequently, the shift lever 79 returns independently of the take-up reel 75 by the freeing action of the one-way transmission device 103 and stops at the home position by contact with the positioning section 78a. It is possible to effect multistep change speed in a single operation by shifting the shift lever 79 a corresponding amount.

Figure 21:
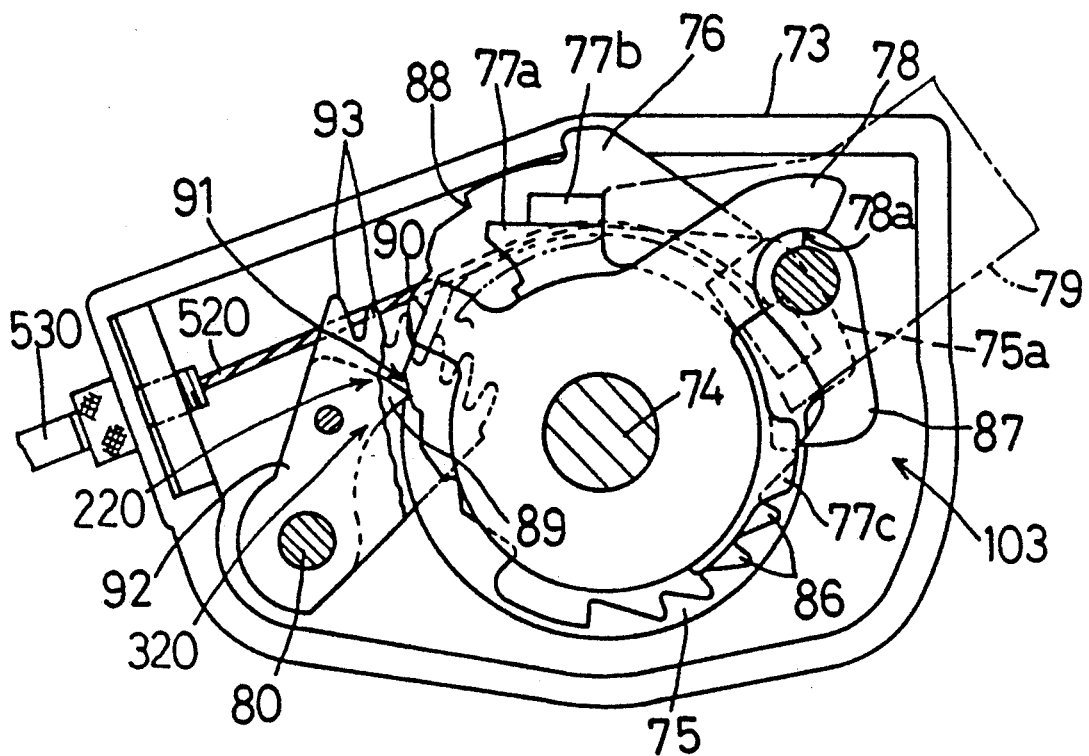

Referring to FIG. 21, when the shift lever 79 is turned from the home position toward the first shift end, i.e. counterclockwise in the drawing, to unwind the wire, a force is transmitted from the shift lever 79 to the release element 78 through the positioning section 78a to rotate the release element 78 in the wire unwinding direction to cancel the action of the position retaining device 220 and to operate the restricting device 320 to limit the backward rotation in the unwinding direction of the take-up reel 75 within one pitch of the position retaining recesses 20. When the cyclist stops pressing the shift lever 79 with the first finger, the release element 78 returns in the winding direction under the force of the third spring 85 to cancel the action of the restricting device 320 and to cause the position retaining device 220 to retain the take-up reel 75 in a position one step backward in the unwinding direction. At the same time, the shift lever 79 returns to the home position. At this time, the restrictor 92 rotates with the position retaining pawl 89 counterclockwise in FIG. 21, whereby one of the restricting teeth 93 is ready for engagement with the restricting pawl 90 in a next unwinding operation.

The foregoing embodiments may be modified as follows:

The shift lever 8 in the first embodiment may have a wide tab 8a with respect to the pivoting direction to facilitate the wire unwinding operation with the first finger.

In the first embodiment, the change speed apparatus 1 has the shift lever disposed under the handlebar 500. Except where the bicycle has a flat handlebar, operation of the shift lever 8 may be facilitated by attaching the change speed apparatus 1 such that the shift lever 8 is located at the opposite side of a surface contacted by the interdigital pads of the hand holding the grip.

In the first embodiment, the position retaining teeth 20 and restricting teeth 22 are formed on the inside walls of the bush 5c of the take-up reel 5. However, these teeth may be formed on outer peripheries, or upper or lower surfaces of the take-up reel 5.

The mechanism of the first embodiment in which the control member is a shift lever 8 may be used in the second embodiment in which the control member is a grip, and vice versa.

In the foregoing embodiments, the present invention is applied for operating a rear derailleur. The present invention is equally applicable for operation of a front derailleur or a contained speed changer.

What is claimed is:

1. A speed control system for a bicycle for controlling a change speed device through a change speed wire, comprising:

a control member movable between a first shift end and a second shift end, with a home position provided between said first shift end and said second shift end;

take-up means connected to one end of said change speed wire, and movable in a wire winding direction and in a wire unwinding direction, said take-up means being urged in said wire unwinding direction;

one-way transmission means for transmitting only movement toward said second shift end of said control member to said take-up means, said take-up means being movable in said wire winding direction by the movement toward said second shift end;

position retaining means for retaining said take-up means in a plurality of winding positions;

retention canceling means for canceling retention of said take-up means by said position retaining means, and allowing said take-up means to move in said wire unwinding direction, said retention canceling means including a release element movable between a release position and a non-release position, said release element being movable to said release position by movement of said control member from said home position toward said first shift end which is opposite to said second shift end with respect to said home position; and urging means for urging said release element to said non-release position.

2. A speed control system as claimed in claim 1, wherein said control member has a locus of movement from said first shift end to said second shift end lying substantially on a single plane.

3. A speed control system as claimed in claim 1, wherein said release element is connectable to said take-up means to transmit a force in said wire winding direction to said take-up means, said urging means being operable to urge said take-up means in said wire winding direction through said release element.

4. A speed control system as claimed in claim 1, further comprising restricting means for restricting the movement in said wire winding direction of said take-up means to a predetermined amount.

5. A speed control system as claimed in claim 1, further comprising neutralizing means for urging said control member to said home position.

6. A speed control system as claimed in claim 1, wherein said control member, said take-up means and said release element are coaxially and rotatably mounted on a single support shaft.

7. A speed control system as claimed in claim 1, wherein said take-up means includes a take-up portion for winding said wire, and a bushing element rotatable with said take-up portion.

8. A speed control system as claimed in claim 7, wherein said position retaining means includes position retaining teeth formed peripherally of said bushing element, a position retaining pawl engageable with said position retaining teeth, and a spring for urging said position retaining pawl toward an engaging position, said position retaining teeth and said position retaining pawl having an engaging configuration for allowing said take-up means to move in said wire winding direction, and locking said take-up means against movement in said wire unwinding direction.

9. A speed control system as claimed in claim 1, wherein said control member is formed as a pivotable lever disposed in a region below a handle grip of the bicycle.

10. A speed control system as claimed in claim 1, wherein said control member is formed as a grip rotatably mounted on a handlebar of the bicycle.

11. A speed control system as claimed in claim 1, wherein movement toward said first shift end and said movement toward said second shift end are both pivotal movements about a common pivot center.

12. A speed control system as claimed in claim 1, wherein there are at least two speed change positions between said home position and said second shift end.

* * * * *